US011375583B2

(12) United States Patent
DeJonge

(10) Patent No.: US 11,375,583 B2
(45) Date of Patent: Jun. 28, 2022

(54) CONTROL DEVICE HAVING A SECONDARY RADIO FOR WAKING UP A PRIMARY RADIO

(71) Applicant: Lutron Technology Company LLC, Coopersburg, PA (US)

(72) Inventor: Stuart W. DeJonge, Riegelsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 116 days.

(21) Appl. No.: 16/858,494

(22) Filed: Apr. 24, 2020

(65) Prior Publication Data

US 2020/0344848 A1 Oct. 29, 2020

Related U.S. Application Data

(60) Provisional application No. 62/838,362, filed on Apr. 25, 2019.

(51) Int. Cl.
*H04B 7/185* (2006.01)
*H04W 88/18* (2009.01)
(Continued)

(52) U.S. Cl.
CPC .............. *H04W 88/18* (2013.01); *E06B 9/68* (2013.01); *H04W 52/0229* (2013.01);
(Continued)

(58) Field of Classification Search
CPC ............. H04W 88/18; H04W 52/0229; H04W 52/0274; H04W 52/24; H04W 52/50;
(Continued)

(56) References Cited

U.S. PATENT DOCUMENTS 6,803,728 B2   10/2004  Balasubramaniam et al.
8,346,313 B2 *  1/2013  Tu ..................... H04W 52/0216
                                                   455/574
(Continued)

FOREIGN PATENT DOCUMENTS

CA        2991337 A1 *  7/2018  ............... G01S 5/02
CN      103326733 A  *  9/2013  ........ H04W 52/0235
(Continued)

*Primary Examiner* — Phuongchau Ba Nguyen
(74) *Attorney, Agent, or Firm* — Michael Czarnecki; Philip Smith; Glen Farbanish

(57) ABSTRACT

A control device may comprise a primary radio circuit for receiving radio-frequency signals via an antenna, and a secondary radio circuit for waking up the primary radio circuit when a radio-frequency signal is presently being transmitted by an external device. The control device may include a control circuit that may be coupled to the primary radio circuit, and may control the primary radio circuit into a sleep mode. The secondary radio circuit may generate a first control signal indicating that the radio-frequency signal is presently being transmitted by the external device. The control circuit may wake up the primary radio circuit from the sleep mode in response to the secondary radio circuit generating the first control signal indicating that the radio-frequency signal is presently being transmitted by the external device.

23 Claims, 5 Drawing Sheets

(51) Int. Cl.
*H05B 47/10* (2020.01)
*E06B 9/68* (2006.01)
*H04W 52/02* (2009.01)

(52) U.S. Cl.
CPC ........ *H04W 52/0274* (2013.01); *H05B 47/10* (2020.01); *E06B 2009/689* (2013.01)

(58) Field of Classification Search
CPC ... H04W 52/16; H04W 52/12; H04W 52/146; E06B 9/68; E06B 2009/689; H05B 47/10; Y02D 30/70; H04B 1/3805
See application file for complete search history.

(56) References Cited

U.S. PATENT DOCUMENTS

| | | | |
|---|---|---|---|
| 9,633,557 B2 | 4/2017 | Dimberg et al. | |
| 10,041,292 B2 | 8/2018 | Cooney et al. | |
| 10,070,504 B2 * | 9/2018 | Mann | H04L 12/283 |
| 10,219,359 B2 | 2/2019 | Harte et al. | |
| 10,264,651 B2 | 4/2019 | Steiner | |
| 10,424,192 B2 | 9/2019 | Mann et al. | |
| 10,772,180 B2 * | 9/2020 | Bhutani | H05B 47/19 |
| 2009/0224890 A1 * | 9/2009 | Kim | H04W 52/0229 340/10.33 |
| 2011/0274021 A1 | 11/2011 | He et al. | |
| 2014/0073262 A1 * | 3/2014 | Gutierrez | G08B 13/22 455/67.11 |
| 2017/0260806 A1 | 9/2017 | Adams et al. | |
| 2018/0014387 A1 * | 1/2018 | Bard | H04L 12/2816 |
| 2018/0376572 A1 * | 12/2018 | Mann | H05B 47/19 |
| 2020/0064784 A1 | 2/2020 | Steiner | |
| 2020/0163013 A1 * | 5/2020 | Grayson | H04W 48/18 |

FOREIGN PATENT DOCUMENTS

| | | | |
|---|---|---|---|
| CN | 113746506 A * | 12/2021 | ........ H04W 52/0229 |
| EP | 3905794 A1 * | 11/2021 | ........... H04L 1/1607 |
| WO | 2019001845 A1 | 1/2019 | |

\* cited by examiner

CONTROL DEVICE HAVING A SECONDARY RADIO FOR WAKING UP A PRIMARY RADIO

CROSS-REFERENCE TO RELATED APPLICATIONS

This application claims the benefit of U.S. Provisional Patent Application No. 62/838,362, filed Apr. 25, 2020, the entire disclosure of which is hereby incorporated by reference.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. A heating, ventilation, and cooling (HVAC) system may be used to control the temperature in the user environment. Each load control system may include various control devices, including control-source devices and control-target devices. The control-target devices may receive messages (e.g., digital messages), which may include load control instructions, for controlling an electrical load from one or more of the control-source devices. The control-target devices may be capable of directly controlling an electrical load. The control-source devices may be capable of indirectly controlling the electrical load via the control-target device. Examples of control-target devices may include lighting control devices (e.g., a dimmer switch, an electronic switch, a ballast, or a light-emitting diode (LED) driver), a motorized window treatment, a temperature control device (e.g., a thermostat), an plug-in load control device, and/or the like. Examples of control-source devices may include remote control devices, occupancy sensors, daylight sensors, temperature sensors, and/or the like.

SUMMARY

As described herein, a control device (e.g., a battery-powered control device, such as a battery-powered motorized window treatment) may operate in a sleep mode to conserve power and may wake up periodically to determine if the control device is receiving radio-frequency signals from an external device (e.g., such as a remote control device and/or a system controller). The control device may comprise a primary radio circuit for receiving the radio-frequency signals via an antenna, and a secondary radio circuit for waking up the primary radio circuit when a radio-frequency signal is presently being transmitted by the external device. The control device may include a control circuit that may be coupled to the primary radio circuit, and may control the primary radio circuit into a sleep mode. The secondary radio circuit may generate a first control signal indicating that the radio-frequency signal is presently being transmitted by the external device. The control circuit may wake up the primary radio circuit from the sleep mode in response to the secondary radio circuit generating the first control signal indicating that the radio-frequency signal is presently being transmitted by the external device. For example, the secondary radio circuit may consume less power than the primary radio circuit, such that the control device consumes less power when the secondary radio circuit is used to wake up the primary radio circuit than when the control device comprises only the primary radio circuit.

DETAILED DESCRIPTION

Figure 1:
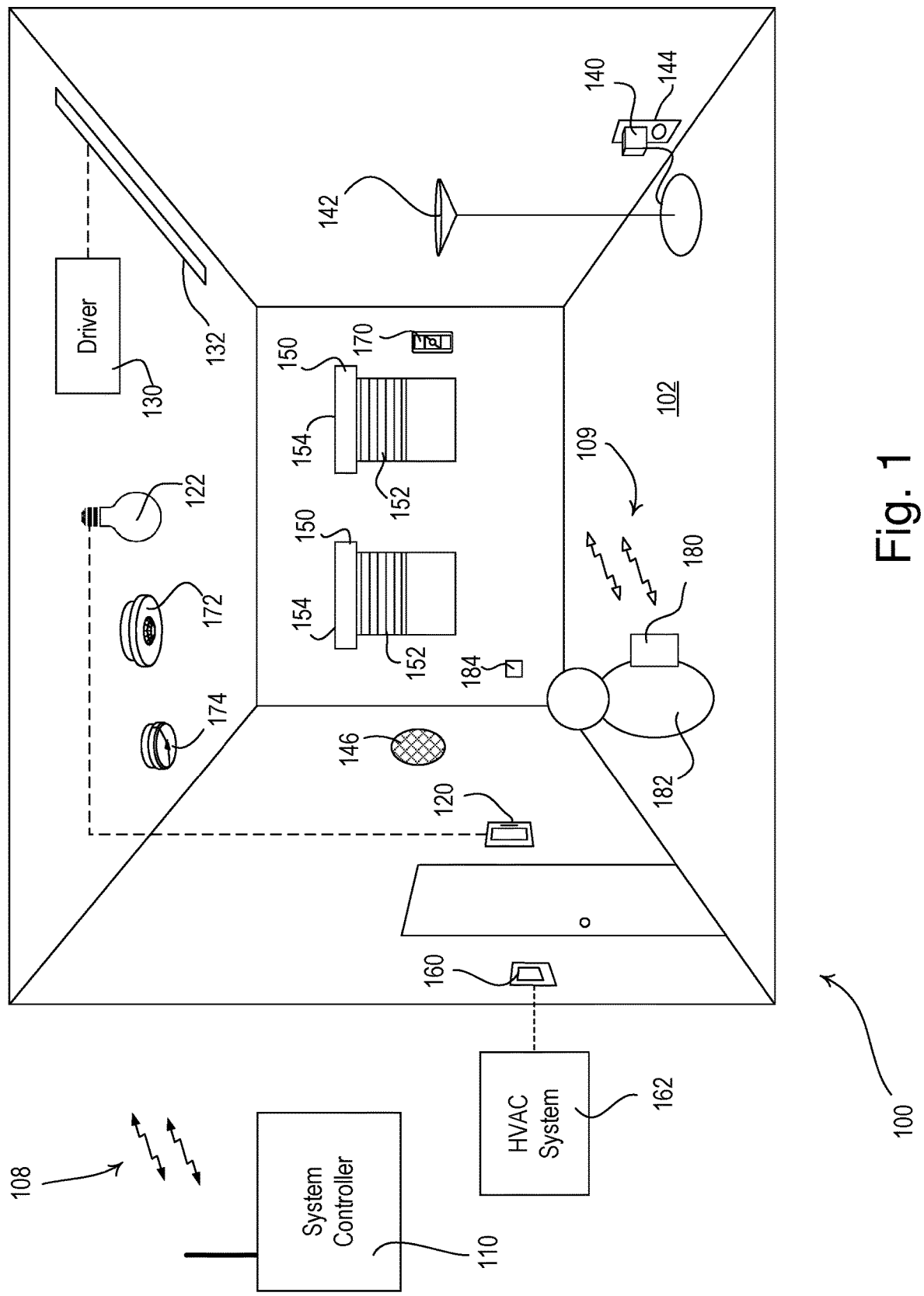
FIG. 1 is a diagram of an example load control system.

FIG. 1 is a diagram of an example load control system 100 for controlling an amount of power delivered from a power source (not shown), such as an alternating-current (AC) power source or a direct-current (DC) power source, to one or more electrical loads. The load control system 100 may be installed in a room 102 of a building. The load control system 100 may comprise a plurality of control devices configured to communicate with each other by transmitting and receiving messages (e.g., digital messages) via wireless signals, e.g., radio-frequency (RF) signals 108. Alternatively or additionally, the load control system 100 may comprise a wired digital communication link coupled to one or more of the control devices to provide for communication between the control devices. The control devices of the load control system 100 may comprise a number of control-source devices (e.g., input devices operable to transmit digital messages in response to user inputs, occupancy/vacancy conditions, changes in measured light intensity, etc.) and a number of control-target devices (e.g., load control devices operable to receive digital messages and control respective electrical loads in response to the received digital messages). A single control device of the load control system 100 may operate as both a control-source and a control-target device.

The control-source devices may be configured to transmit digital messages directly to the control-target devices. In addition, the load control system 100 may comprise a system controller 110 (e.g., a central processor or load controller) configured to communicate digital messages to and from the control devices (e.g., the control-source devices and/or the control-target devices). For example, the system controller 110 may be configured to receive digital messages from the control-source devices and transmit digital messages to the control-target devices in response to the digital messages received from the control-source devices.

The load control system 100 may comprise one or more load control devices, such as a dimmer switch 120 (e.g., a control-target device) for controlling a lighting load 122. The dimmer switch 120 may be configured to control an amount of power delivered from the AC power source to the lighting load to adjust an intensity level and/or a color (e.g., a color temperature) of the lighting load. The dimmer switch 120 may be adapted to be wall-mounted in a standard electrical wallbox. The dimmer switch 120 may also comprise a tabletop or plug-in load control device. The dimmer switch 120 may comprise a toggle actuator (e.g., a button) and an intensity adjustment actuator (e.g., a rocker switch). Actuations (e.g., successive actuations) of the toggle actuator may toggle (e.g., turn off and on) the lighting load 122. Actuations of an upper portion or a lower portion of the intensity adjustment actuator may respectively increase or decrease the amount of power delivered to the lighting load 122 and thus increase or decrease the intensity of the receptive lighting load from a minimum intensity (e.g., approximately 1%) to a maximum intensity (e.g., approximately 100%). The dimmer switch 120 may comprise a plurality of visual indicators, e.g., light-emitting diodes (LEDs), which are arranged in a linear array and are illuminated to provide feedback of the intensity of the lighting load 122. Examples of wall-mounted dimmer switches are described in greater detail in U.S. Pat. No. 9,679,696, issue Jun. 13, 2017, entitled WIRELESS LOAD CONTROL DEVICE, the entire disclosure of which is hereby incorporated by reference.

The dimmer switch 120 may comprise an internal power supply for powering the electrical circuitry of the dimmer switch. The dimmer switch 120 may be a "two-wire" dimmer switch (e.g., may not be connected to a neutral side of the AC power source) and the power supply may be configured to conduct a charging current through the lighting load 122 for generating a supply voltage. In addition, the dimmer switch 120 may comprise an earth ground connection, and may be configured to conduct the charging current of the power supply through the earth ground connection.

The dimmer switch 120 may be configured to wirelessly receive digital messages via the RF signals 108 (e.g., from the system controller 110) and to control the lighting load 122 in response to the received digital messages. Examples of dimmer switches and other control devices configured to transmit and receive digital messages are described in greater detail in commonly-assigned U.S. Pat. No. 10,041,292, issued Aug. 7, 2018, entitled LOW-POWER RADIO-FREQUENCY RECEIVER, and U.S. Pat. No. 10,271,407, issued Apr. 23, 2019, entitled LOAD CONTROL DEVICE HAVING INTERNET CONNECTIVITY, the entire disclosures of which are hereby incorporated by reference.

The load control system 100 may comprise one or more remotely-located load control devices, such as a light-emitting diode (LED) driver 130 (e.g., a control-target device) for driving an LED light source 132 (e.g., an LED light engine). The LED driver 130 may be located remotely, for example, in or adjacent to the lighting fixture of the LED light source 132. The LED driver 130 may be configured to receive digital messages via the RF signals 108 (e.g., from the system controller 110) and to control the LED light source 132 in response to the received digital messages. The LED driver 130 may be configured to adjust the color temperature of the LED light source 132 in response to the received digital messages. The load control system 100 may further comprise other types of remotely-located load control devices, such as, for example, electronic dimming ballasts for driving fluorescent lamps.

The load control system 100 may comprise a plug-in load control device 140 (e.g., a control-target device) for controlling a plug-in electrical load, e.g., a plug-in lighting load (e.g., such as a floor lamp 142 or a table lamp) and/or an appliance (e.g., such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive digital messages via the RF signals 108 (e.g., from the system controller 110) and to turn on and off or adjust the intensity of the floor lamp 142 in response to the received digital messages.

Alternatively or additionally, the load control system 100 may comprise controllable receptacles (e.g., control-target devices) for controlling plug-in electrical loads plugged into the receptacles. The load control system 100 may comprise one or more load control devices or appliances that are able to directly receive the wireless signals 108 from the system controller 110, such as a speaker 146 (e.g., part of an audio/visual or intercom system), which is able to generate audible sounds, such as alarms, music, intercom functionality, etc.

The load control system 100 may comprise one or more daylight control devices, e.g., motorized window treatments 150 (e.g., control-target devices), such as motorized cellular shades or roller shades, for controlling the amount of daylight entering the room 102. Each motorized window treatments 150 may comprise a window treatment fabric 152 hanging from a headrail 154 in front of a respective window. Each motorized window treatment 150 may further comprise a motor drive unit 155 located inside of the headrail 154 for raising and lowering the window treatment fabric 152 for controlling the amount of daylight entering the room 102. The motor drive units 155 of the motorized window treatments 150 may be configured to receive digital messages via the RF signals 108 (e.g., from the system controller 110) and adjust the position of the respective window treatment fabric 152 in response to the received digital messages. The motor drive unit 155 of each motorized window treatment 150 may be battery-powered or may be coupled to an external alternating-current (AC) or direct-current (DC) power source. In addition, the motorized window treatments 150 may comprise internal storage elements, such as supercapacitors and/or rechargeable batteries, and may be configured to charge (e.g., trickle charge) the internal storage elements from a DC power source via a power bus (e.g., by drawing a small amount of current via the power bus). The load control system 100 may comprise other types of daylight control devices, such as, for example, a cellular shade, a drapery, a Roman shade, a Venetian blind, a Persian blind, a pleated blind, a tensioned roller shade systems, an electrochromic or smart window, and/or other suitable daylight control device. Examples of battery-powered motorized window treatments are described in greater detail in U.S. Pat. No. 10,494,864, issued Dec. 3, 2019, entitled MOTORIZED WINDOW TREATMENT, the entire disclosure of which is hereby incorporated by reference.

The load control system 100 may comprise one or more temperature control devices, e.g., a thermostat 160 (e.g., a control-target device) for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate digital messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. For example, the thermostat 160 and the wireless temperature sensors may be battery-powered. The HVAC system 162 may be configured to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102.

The load control system 100 may comprise one or more other types of load control devices (e.g., control-target devices), such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices (e.g., control-source devices), such as a remote control device 170, an occupancy sensor 172, and/or a daylight sensor 174. The input devices may be fixed or movable input devices. The remote control device 170, the occupancy sensor 172, and/or the daylight sensor 174 may be wireless control devices (e.g., RF transmitters) configured to transmit digital messages via the RF signals 108 to the system controller 110 (e.g., directly to the system controller). The system controller 110 may be configured to transmit one or more digital messages to the load control devices (e.g., the dimmer switch 120, the LED driver 130, the plug-in load control device 140, the motorized window treatments 150, and/or the thermostat 160) in response to the digital messages received from the remote control device 170, the occupancy sensor 172, and/or the daylight sensor 174. The remote control device 170, the occupancy sensor 172, and/or the daylight sensor 174 may be configured to transmit digital messages directly to the dimmer switch 120, the LED driver 130, the plug-in load control device 140, the motorized window treatments 150, and the temperature control device 160.

The remote control device 170 may be configured to transmit digital messages to the system controller 110 via the RF signals 108 in response to an actuation of one or more buttons of the remote control device. For example, the remote control device 170 may be battery-powered.

The occupancy sensor 172 may be configured to detect occupancy and vacancy conditions in the room 102 (e.g., the room in which the occupancy sensors are mounted). For example, the occupancy sensor 172 may be battery-powered. The occupancy sensor 172 may transmit digital messages to the system controller 110 via the RF signals 108 in response to detecting the occupancy or vacancy conditions. The system controller 110 may be configured to turn the lighting loads (e.g., lighting load 122 and/or the LED light source 132) on and off in response to receiving an occupied command and a vacant command, respectively. The occupancy sensor 172 may operate as a vacancy sensor, such that the lighting loads are only turned off in response to detecting a vacancy condition (e.g., and not turned on in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING, the entire disclosure of which is hereby incorporated by reference.

The daylight sensor 174 may be configured to measure a total light intensity in the room 102 (e.g., the room in which the daylight sensor is installed). For example, the daylight sensor 174 may be battery-powered. The daylight sensor 174 may transmit digital messages (e.g., including the measured light intensity) to the system controller 110 via the RF signals 108 for controlling the intensities of the lighting load 122 and/or the LED light source 132 in response to the measured light intensity. Examples of RF load control systems having daylight sensors are described in greater detail in commonly-assigned U.S. Pat. No. 8,451,116, issued May 28, 2013, entitled WIRELESS BATTERY-POWERED DAYLIGHT SENSOR, the entire disclosure of which is hereby incorporated by reference.

The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be configured to be coupled to a network, such as a wireless or wired local area network (LAN), e.g., for access to the Internet. The system controller 110 may be wirelessly connected to the network, e.g., using a WI-FI network. The system controller 110 may be coupled to the network via a network communication bus (e.g., an Ethernet communication link).

The system controller 110 may be configured to communicate via the network with one or more network devices, e.g., a mobile device 180, such as, a personal computing device and/or a wearable wireless device. The mobile device 180 may be located on an occupant 182, for example, may be attached to the occupant's body or clothing or may be held by the occupant. The mobile device 180 may be characterized by a unique identifier (e.g., a serial number or address stored in memory) that uniquely identifies the mobile device 180 and thus the occupant 182. Examples of personal computing devices may include a smart phone, a laptop, and/or a tablet device. Examples of wearable wireless devices may include an activity tracking device, a smart watch, smart clothing, and/or smart glasses. In addition, the system controller 110 may be configured to communicate via the network with one or more other control systems (e.g., a building management system, a security system, etc.).

The mobile device 180 may be configured to transmit digital messages via RF signals 109 to the system controller 110, for example, in one or more Internet Protocol packets. For example, the mobile device 180 may be configured to transmit digital messages to the system controller 110 over the LAN and/or via the Internet. The mobile device 180 may be configured to transmit digital messages over the internet to an external service, and then the digital messages may be received by the system controller 110. The load control system 100 may comprise other types of network devices coupled to the network, such as a desktop personal computer (PC), a wireless-communication-capable television, or any other suitable Internet-Protocol-enabled device.

The operation of the load control system 100 may be programmed and configured using, for example, the mobile device 180 or other network device (e.g., when the mobile device is a personal computing device). The mobile device 180 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the dimmer switch 120, the LED driver 130, the plug-in load control device 140, the motorized window treatments 150, and/or the thermostat 160). The load control database may comprise information regarding associations between the load control devices and the input devices (e.g., the remote control device 170, the occupancy sensor 172, and/or the daylight sensor 174). The load control database may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM, and U.S. Pat. No. 10,027,127, issued Jul. 17, 2018, entitled COMMISSIONING LOAD CONTROL SYSTEMS, the entire disclosures of which are hereby incorporated by reference.

The system controller 110 may be configured to determine the location of the mobile device 180 and/or the occupant 182. The system controller 110 may be configured to control (e.g., automatically control) the load control devices (e.g., the dimmer switch 120, the LED driver 130, the plug-in load control device 140, the motorized window treatments 150, and/or the temperature control device 160) in response to determining the location of the mobile device 180 and/or the occupant 182. The system controller 110 may be configured to control the load control devices according to occupant control parameters associated with the occupant 182. The occupant control parameters may be predetermined or preset settings for the occupant 182, biometric data for the occupant, and/or user input data received from the user via the mobile device 180.

One or more of the control devices of the load control system 100 may transmit beacon signals, for example, RF beacon signals transmitted using a short-range and/or low-power RF technology. The load control system 100 may comprise at least one beacon transmitting device 184 for transmitting the beacon signals. The beacon transmitting devices 184 may be battery-powered (e.g., including a battery for powering the beacon transmitting device). The beacon transmitting device 184 may also be plugged into a receptacle to receive AC power and/or may be connected to an external power supply for receiving DC power. Any fixed-location control device of the load control system 100 (e.g., any of the load control devices, such as the dimmer switch 120, the LED driver 130, the motorized window treatments 150, and/or the temperature control device 160) may be also be configured to transmit the beacon signals (e.g., to operate beacon transmitting devices).

The mobile device 180 may be configured to receive a beacon signal when located near a control device that is presently transmitting the beacon signal. A beacon signal may comprise a unique identifier identifying the location of the load control device that transmitted the beacon signal. Since the beacon signal may be transmitted using a short-range and/or low-power technology, the unique identifier may indicate the approximate location of the mobile device 180. The mobile device 180 may be configured to transmit the unique identifier to the system controller 110, which may be configured to determine the location of the mobile device 180 using the unique identifier (e.g., using data stored in memory or retrieved via the Internet). The system controller 110 may be configured to transmit control data (e.g., the determined location and/or names of an area, groups, zones, electrical loads, control devices, load control devices, input devices, presets, and/or scenes associated with the location) back to the mobile device 180 and/or control (e.g., automatically control) the load control devices in response to the location of the mobile device.

The system controller 110 may be configured to determine the location of the mobile device 180 using triangulation. Since the load control devices of the load control system 100 may be mounted in fixed locations, the load control devices may measure the signal strength of RF signals received from the mobile device 180. The load control devices may transmit these signals strengths to the system controller 110, which may be configured to determine the location of the mobile device using the signal strengths. One or more load control devices of the load control system 100 may be movable devices. As such, the load control system 100 may comprise fixed and movable load control devices. An example of a load control system for controlling one or more electrical loads in response to the position of a mobile device and/or occupant inside of a building is described in greater detail in commonly-assigned U.S. Patent Application Publication No. 2016/0056629, published Feb. 25, 2016, entitled LOAD CONTROL SYSTEM RESPONSIVE TO LOCATION OF AN OCCUPANT AND MOBILE DEVICES, the entire disclosure of which is hereby incorporated by reference.

Figure 2:
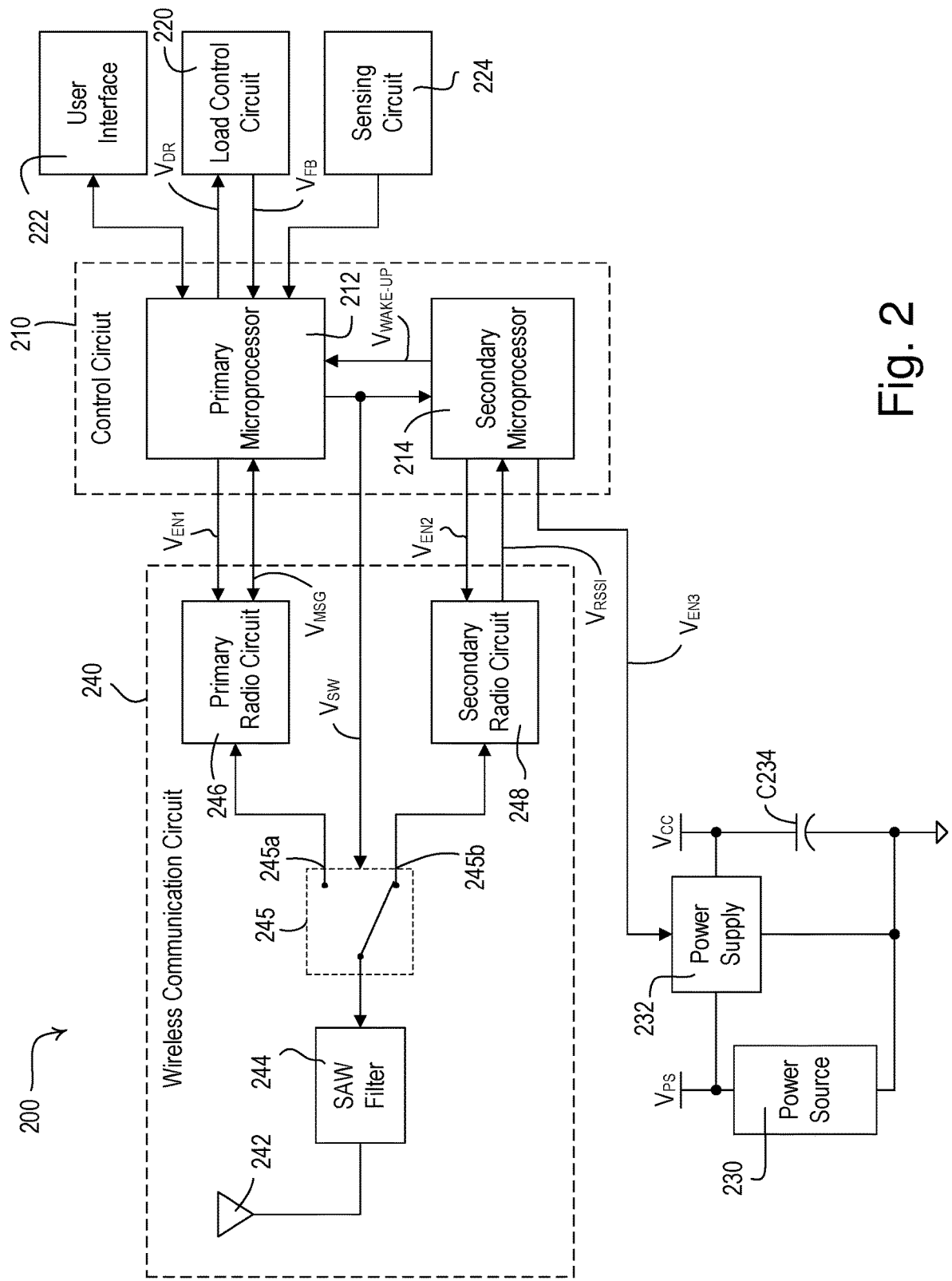
FIG. 2 is a block diagram of an example control device having a secondary radio circuit for waking up a primary radio circuit.

FIG. 2 is a block diagram of an example control device 200, which may be deployed in a load control system (e.g., the load control system 100 shown in FIG. 1). The control device 200 may comprise a control circuit 210, which may include a first digital control circuit, such a primary microprocessor 212. The first digital control circuit may also comprise, for example, a microcontroller, a programmable logic device (PLD), an application specific integrated circuit (ASIC), a field-programmable gate array (FPGA), or any suitable processing device or control circuit. The control device 200 may comprise a memory (not shown) configured to store operational characteristics of the control device. The memory may be implemented as an external integrated circuit (IC) or as an internal circuit of the control circuit 210.

The control device 200 may comprise a load control circuit 220 for controlling an electrical load, e.g., an external and/or internal electrical load (not shown). The primary microprocessor 212 may be configured to generate one or more drive signals $V_{DR}$ for controlling the load control circuit 220 to control the electrical load (e.g., to turn the electrical load on or off, and/or to control the amount of power delivered to the electrical load). The primary microprocessor 212 may also be configured to receive one or more feedback signals $V_{FB}$ (e.g., indicating the magnitude of a load current conducted through the electrical load and/or a load voltage developed across the electrical load) from the load control circuit 220. For example, the control device 200 may comprise a dimmer switch (e.g., such as the dimmer switch 120 shown in FIG. 1) and the load control circuit may comprise a controllably conductive device, such as a thyristor (e.g., a triac) or one or more field-effect transistors (FETs), coupled in series with a lighting load for controlling the amount of power delivered to the lighting load and thus an intensity of the lighting load. In addition, the control device 200 may comprise a light-emitting diode (LED) driver, and the load control circuit 220 may comprise an LED driver circuit for controlling the intensity (e.g., brightness) and/or color of one or more LED light sources. The control device 200 may also comprise a motor drive unit for a motorized window treatment, and the load control circuit 220 may comprise a motor drive circuit (e.g., an H-bridge drive circuit) for controlling a motor to adjust a position of a covering material of the motorized window treatment. For example, the feedback signals $V_{FB}$ of the motorized window treatment may be generated by a Hall-effect sensor circuit and may indicate a position of the covering material and/or direction of rotation of the motor.

The control device 200 may comprise a user interface 222, which may comprise, for example, one or more actuators (e.g., buttons) for receiving user inputs and/or one or more visual indicators for providing user feedback. For example, if the control device 200 comprises a wall-mounted dimmer switch (e.g., such as the dimmer switch 120 shown in FIG. 1), the user interface 220 may comprise a toggle actuator and an intensity adjustment actuator (e.g., such as a slider control or a pair of raise and lower buttons) for controlling a lighting load. In addition, if the control device 200 comprises a remote control device (e.g., such as the remote control device 170 shown in FIG. 1), the user interface 222 may comprise one or more buttons for controlling one or more electrical loads, for example, by selecting preset (e.g., scenes) of the load control system. The user interface 222 may also comprise one or more light-emitting diodes (LEDs) for illuminating the visual indicators, for example, to provide a visual indication of a status and/or a present intensity of a lighting load, and/or a visual indication of a selected preset. The primary microprocessor 212 of the control circuit 210 may be configured to control the load control circuit 220 in response to actuations of the actuators of the user interface 222, and may be coupled to the LEDs for illuminating the visual indicators to provide feedback.

The control device 200 may also comprise a sensing circuit 224 configured to detect and/or measure one or more environmental characteristics in the environment of the control device. For example, the sensing circuit 224 may comprise an occupancy detection circuit configured to detect an occupancy or vacancy condition in the vicinity of the control device 200. The sensing circuit 224 may include a detector, such as, for example, a pyroelectric infrared (PIR) detector, an ultrasonic detector, and/or a microwave detector, for detecting an occupancy or vacancy condition in the vicinity of the control device 200. The control circuit 210 may be configured to determine a vacancy condition in the space after a timeout period expires since the last occupancy condition was detected. The control circuit 210 may be configured to control the load control circuit 220 to control the intensity of the electrical load in response to the sensing circuit 224 detecting occupancy and/or vacancy conditions. The sensing circuit 224 may also comprise a daylight sensing circuit (e.g., including a photodiode) for measuring an ambient light level in the space around the control device 200. In addition, the sensing circuit 224 may comprise a temperature sensing circuit for measuring a present temperature in the vicinity of the control device 200.

The control device 200 may comprise a power source 230 (e.g., an internal power source) for producing a direct-current (DC) voltage $V_{PS}$. For example, the power source 230 may comprise one or more batteries and/or a photovoltaic power source (e.g., a solar cell). In addition, the power source 230 may comprise one or more energy storage elements, such as super capacitors and/or rechargeable batteries, configured to charge from an external DC power supply via a power bus. The control device 200 may also comprise a power supply 232 that may receive the DC voltage $V_{PS}$ and generate a low-voltage DC supply voltage $V_{CC}$ across a capacitor C234 (e.g., an energy storage capacitor) for powering the control circuit 210, the user interface 222, the sensing circuit 224, and other low-voltage circuitry of the control device 200. For example, if the control device 200 comprises a motor drive unit for a battery-powered motorized window treatment, the load control circuit 220 may receive power from the power source 230 (e.g., directly from the DC voltage $V_{PS}$), while the other circuitry may be powered from the DC supply voltage $V_{CC}$. In addition, the low-voltage circuitry of the control device 200 may also be powered (e.g., directly powered) from the DC voltage $V_{PS}$ produced by the power source (e.g., the control device 200 may not comprise the power supply 232). Further, the control device 200 may also receive power from an external power source, such as an alternating-current (AC) power source (not shown). For example, if the control device 200 comprises a dimmer switch (e.g., a two-wire dimmer switch), the power supply 232 may be electrically coupled in parallel with the controllably conductive device of the load control circuit 220 for conducting a charging current to generate the DC supply voltage $V_{CC}$ when the controllably conductive device is non-conductive. The power supply 232 may also be configured to conduct the charging current through an earth ground connection.

The control device 200 may comprise a wireless communication circuit 240 configured to communicate (e.g., transmit and/or receive) wireless signals, such as RF signals (e.g., the RF signals 108 shown in FIG. 1). The wireless communication circuit 240 may comprise an antenna 242 for transmitting and receiving the RF signals and a surface acoustic wave (SAW) filter 244 (e.g., which may be optional). The wireless communication circuit 240 may comprise two radio circuits: a primary radio circuit 246 (e.g., a first radio circuit) and a secondary radio circuit 248 (e.g., a second radio circuit). The primary and secondary radio circuits 246, 248 may be coupled (e.g., selectively and/or controllably coupled) to the SAW filter 244 via an RF switch 245. The primary microprocessor 212 may generate a switch control signal $V_{SW}$ for controlling the RF switch 245 to be connected to a first contact 245a or a second contact 245b. The primary microprocessor 212 may be configured to control the RF switch 245 to allow the secondary radio circuit 248 to monitor for transmitted RF signals most of the time (e.g., when RF signals are not being transmitted by other control devices) and then change to allow the primary radio circuit 246 to receive one of the RF signals (e.g., in response to the secondary radio circuit 248 detecting an RF signal), such that the primary radio circuit 246 is enabled (e.g., only enabled) for short periods of time (e.g., an RF signal is being transmitted by another control device).

The primary radio circuit 246 may comprise an RF transceiver for transmitting and receiving the RF signals via the antenna 242 when the RF switch 245 is connected to the first contact 245a. In addition, the primary radio circuit 246 may simply comprise an RF receiver. The primary radio circuit 246 may be coupled to the primary microprocessor 212 for communicating message signals $V_{MSG}$ (e.g., the digital messages transmitted and received via the antenna 242) with the primary microprocessor. The primary radio circuit 246 may be powered from the DC supply voltage $V_{CC}$. The primary radio circuit 246 may be configured to communicate RF signals on one or more communication channels (e.g., frequencies), which may be adjusted by the primary microprocessor 212. The primary radio circuit 246 may receive a first enable control signal $V_{EN1}$ from the primary microprocessor 212 for enabling and disabling the primary radio circuit 246 (e.g., controlling the primary radio circuit in and out of a sleep mode). The primary microprocessor 212 may also be configured to enter a sleep mode when the primary radio circuit 246 is in the sleep mode. The primary microprocessor 212 and the primary radio circuit 246 may both be configured to consume less power in the sleep more than when awake in a normal operation mode. The primary microprocessor 212 may be configured to control the load control circuit 220 to control the electrical load in response to digital messages received from the primary radio circuit 246 via the message signals $V_{MSG}$. The primary microprocessor 212 may be configured to control the visual indicators of the user interface 222 in response to digital messages received from the primary radio circuit 246 via the message signals $V_{MSG}$. The primary microprocessor 212 may be configured to transmit digital messages for controlling an electrical load via the primary radio circuit 246 in response to the user interface 222 and/or the sensing circuit 224.

The secondary radio circuit 246 may comprise an RF receiver for receiving the RF signals via the antenna 242 when the RF switch 245 is connected to the second contact 245b (e.g., as shown in FIG. 2). For example, the secondary radio circuit 246 may comprise part number MAX7033, manufactured by Maxim Integrated. The secondary radio circuit 248 may be powered from the DC supply voltage $V_{CC}$. The secondary radio circuit 248 may be characterized by a smaller power dissipation (e.g., power consumption) than the primary radio circuit 246. For example, the primary radio circuit 246 may be characterized by a typical power dissipation of approximately 48 mW, while the secondary radio circuit 248 may be characterized by a typical power dissipation of approximately 19 mW. The secondary radio circuit 248 may be configured to receive RF signals on a single communication channel (e.g., frequency). The secondary radio circuit 248 may be configured to generate a received signal strength identifier (RSSI) signal $V_{RSSI}$, which may have a magnitude that may indicate the signal strength of the RF signals received via the antenna 242 when the RF switch 245 is connected to the second contact 245b. The received signal strength identifier signal $V_{RSSI}$ generated by the secondary radio circuit 248 may be characterized by a fast stabilization time (e.g., approximately 200-250 microseconds). In addition, the secondary radio circuit 248 may simply comprise a received signal strength measurement circuit. Further, the secondary radio circuit 248 may comprise an RF transceiver configured to generate the received signal strength identifier signal $V_{RSSI}$.

The primary microprocessor 212 may be configured to control the primary radio circuit 246 in and out of the sleep mode in response to the secondary radio circuit 214. The control circuit 210 may comprise a second digital control circuit, such as a secondary microprocessor 214, for interfacing between the primary microprocessor 212 and the secondary radio circuit 248. The second digital control circuit may also comprise, for example, a microcontroller, a programmable logic device (PLD), an application specific integrated circuit (ASIC), a field-programmable gate array (FPGA), or any suitable processing device or control circuit. The secondary microprocessor 214 may generate a wake-up control signal $V_{WAKE\_UP}$ for waking up the primary microprocessor 212 from the sleep mode. For example, the wake-up control signal $V_{WAKE\_UP}$ may be received at an interrupt pin of the primary microprocessor 212. The secondary microprocessor 214 may receive the received signal strength identifier signal $V_{RSSI}$ generated by the secondary radio circuit 248 at an analog-to-digital converter (ADC) port of the secondary microprocessor. The secondary microprocessor 214 may generate a second enable control signal $V_{EN2}$ for enabling and disabling the secondary radio circuit 248 (e.g., controlling the secondary radio circuit in and out of a sleep mode during which the secondary radio circuit may consume less power). The secondary microprocessor 214 may also generate a third enable control signal $V_{EN3}$ for enabling and disabling the power supply 232. When the secondary radio circuit 248 is in the sleep mode (e.g., disabled), the secondary microprocessor 214 may also be configured to enter a sleep mode during which the secondary microprocessor may consume less power. The secondary microprocessor 214 may be configured to exit the sleep mode before (e.g., immediately before) enabling the secondary radio circuit 248 and enter the sleep mode after (e.g., immediate after) disabling the secondary radio circuit. The secondary microprocessor 214 may be configured to exit the sleep mode in response to an internal timer of the secondary microprocessor.

The secondary microprocessor 214 may be configured to enable (e.g., periodically enable) the secondary radio circuit 248 (e.g., approximately every 17.6 milliseconds), wait for a wait time period $T_{WAIT}$ (e.g., approximately 250 microseconds) until the magnitude of the received signal strength identifier signal $V_{RSSI}$ has stabilized (e.g., reached a steady state value), and then sample the received signal strength identifier signal $V_{RSSI}$. If the magnitude of the received signal strength identifier signal $V_{RSSI}$ exceeds a threshold $V_{TH}$ (e.g., indicating that the magnitude of the received RF signal exceeds approximately −90 dBm), the secondary microprocessor 214 may determine that an RF signal is presently being transmitted by another control device and may control the wake-up control signal $V_{WAKE-UP}$ to wake up the primary microprocessor 212 from the sleep mode into a normal operation mode. After waking up, the primary microprocessor 212 may control the switch control signal $V_{SW}$ to adjust the RF switch 245 from the second contact 245b to the first contact 245a, and control the first enable control signal $V_{EN1}$ to wake up the primary radio circuit 246, such that the primary radio circuit 246 may receive RF signals via the antenna 242. The primary microprocessor 212 may be configured to enter the sleep mode after any required processing is complete, e.g., after transmitting and/or receiving of digital message is complete and/or after any processing required in response to a received digital message is complete. The secondary microprocessor 214 may also be configured to enter the sleep mode after the primary microprocessor 212 has entered the sleep mode.

Figure 3:
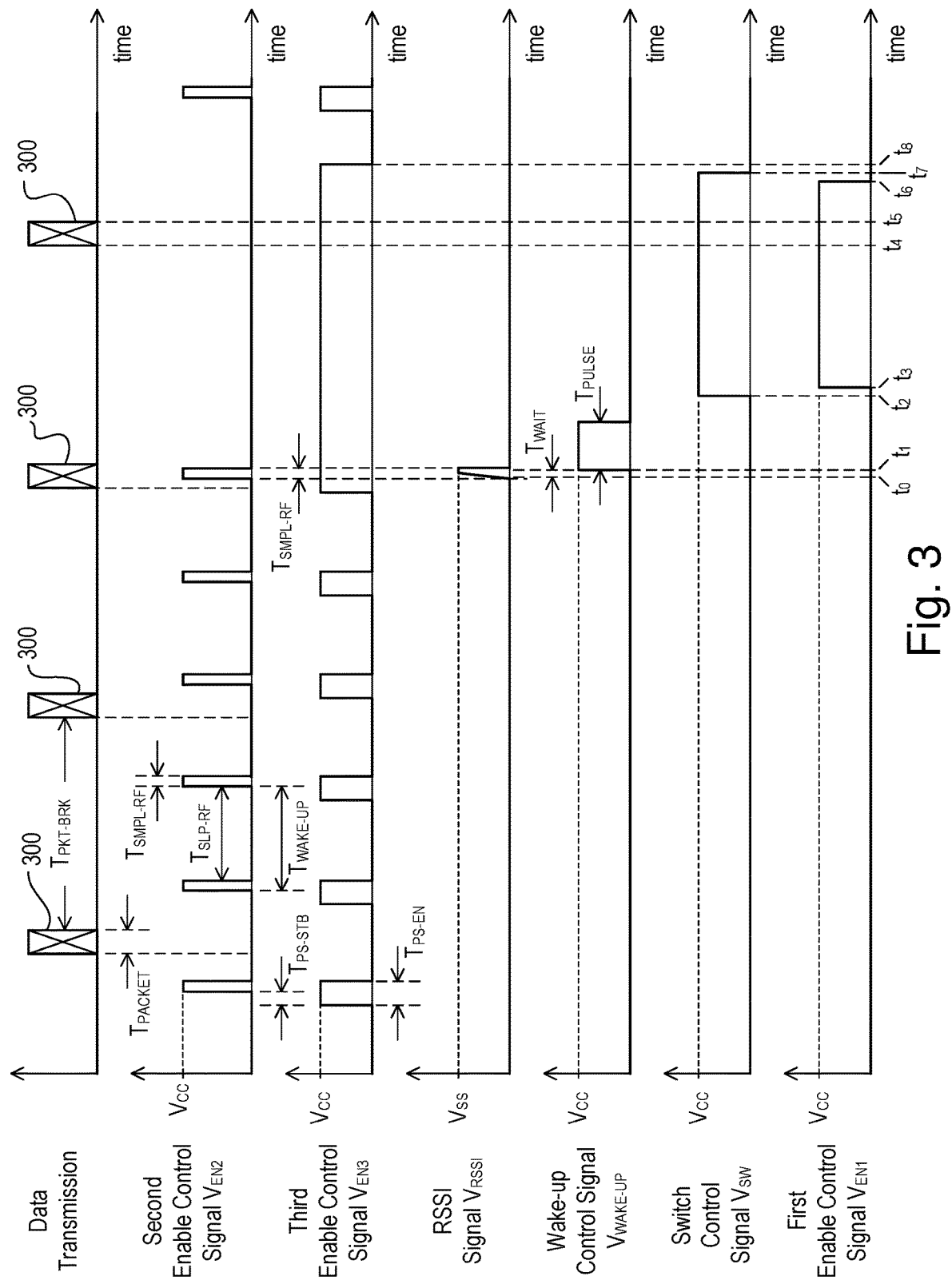
FIG. 3 illustrates example waveforms of the control device of FIG. 2.

FIG. 3 is a timing diagram illustrating example waveforms of a control device (e.g., one of the control devices of the load control system 100 of FIG. 1 and/or the control device 200 of FIG. 2) during a data transmission event. For example, the data transmission event may involve the transmission of a particular digital message (e.g., including a command) transmitted by a transmitting device (e.g., the remote control device 170) to the control device 200. During the data transmission event, the transmitting device may transmit packets 300 (e.g., with each packet including the same digital message and/or command) via RF signals (e.g., RF signals 108). Each packet 300 transmitted by the transmitting device may have a length equal to a packet time period $T_{PACKET}$ (e.g., approximately 5 milliseconds). Each packet 300 may be transmitted multiple times (e.g., up to twelve times) during the data transmission event. For example, four packets 300 are shown in FIG. 3 even though the data transmission event may include more packets. Between each packet 300, there may be a packet break time period $T_{PKT\text{-}BRK}$ (e.g., approximately 75 milliseconds), such that the transmitting device transmits packets of data at a transmission rate of approximately 12.5 packets per second. Alternatively, the break time period $T_{PKT\text{-}BRK}$ may not be a fixed value, but may be a varying or random time between each of the transmitted packets 300.

While the control device 200 is not receiving RF signals (e.g., the packets 300) via the wireless communication circuit 240, the primary microprocessor 212 and the primary radio circuit 246 may each be in the sleep mode. At this time, the first enable control signal $V_{EN1}$ may be low (e.g., at circuit common), which may cause the first radio circuit 246 to be in the sleep mode. In addition, the switch control signal $V_{SW}$ may be low (e.g., at circuit common), which may cause the RF switch 245 to be connected to the second contact 245b. In addition, the third enable control signal $V_{EN3}$ may be low (e.g., at circuit common), which may disable the power supply 232. While the power supply 232 is disabled, the primary microprocessor 212 and the secondary microprocessor 214 may draw a small amount of current from the capacitor C234.

The secondary microprocessor 214 may periodically drive the second enable control signal $V_{EN2}$ high towards the DC supply voltage $V_{CC}$ to periodically wake up the secondary radio circuit 248 to see if any control devices are presently transmitting one of the packets 300. For example, the secondary microprocessor 214 may enable the secondary radio circuit 248 for a sampling time period $T_{SMPL\text{-}RF}$ (e.g., approximately 300 microseconds) before driving the second enable control signal $V_{EN2}$ low towards circuit common. The secondary microprocessor 214 may drive the second enable control signal $V_{EN2}$ high to start the sampling time period $T_{SMPL\text{-}RF}$ periodically according to a wake-up period $T_{WAKE\text{-}UP}$ (e.g., every 17.6 milliseconds). The secondary radio circuit 248 may consume (e.g., only consume) significant power during the sampling time periods $T_{SMPL\text{-}RF}$.

Prior to enabling the secondary radio circuit 248 during each sampling time period $T_{SMPL\text{-}RF}$, the secondary microprocessor 214 may drive the third enable control signal $V_{EN3}$ high to enable the power supply 232. For example, the secondary microprocessor 214 may drive the third enable control signal $V_{EN3}$ high to enable the power supply 232 at the beginning of a power-supply stabilization time period $T_{PS\text{-}STB}$ before driving the second enable control signal $V_{EN2}$ high to enable the secondary radio circuit 248. The power-supply stabilization time period $T_{PS\text{-}STB}$ may allow the magnitude of the supply voltage $V_{CC}$ to stabilize (e.g., reach a steady-state value) before the secondary radio circuit 248 is enabled. The secondary microprocessor 214 may keep the power supply 232 enabled until the end of the sampling time period $T_{SMPL\text{-}RF}$, such that the power supply is periodically enabled for a power-supply enable time period $T_{PS\text{-}EN}$.

During each sampling time period $T_{SMPL\text{-}RF}$, the secondary microprocessor 214 may wait for the wait time period $T_{WAIT}$ to allow the magnitude of the received signal strength identifier signal $V_{RSSI}$ to stabilize before trying to determine if a packet 300 is being transmitted during that sampling time period. At the end of the wait time period $T_{WAIT}$, the secondary microprocessor 214 may sample the received signal strength identifier signal $V_{RSSI}$ and compare the sampled magnitude to the threshold $V_{TH}$ to determine if a packet 300 is being transmitted during the sampling time period $T_{SMPL\text{-}RF}$. If the secondary microprocessor 214 determines that a packet 300 is not being transmitted during the RF sample time period $T_{SMPL\text{-}RF}$, the secondary processor 214 may drive the second enable control signal $V_{EN2}$ low to cause the secondary radio circuit 248 to enter the sleep mode for an RF sleep time period $T_{SLP\text{-}RF}$. In addition, the secondary processor 214 may drive the third enable control signal $V_{EN3}$ low to disable the power supply 232 if the secondary microprocessor 214 determines that a packet 300 is not being transmitted during the RF sample time period $T_{SMPL\text{-}RF}$.

If a packet 300 is being transmitted during the RF sample time period $T_{SMPL\text{-}RF}$, the magnitude of the received signal strength identifier signal $V_{RSSI}$ may increase from a minimum magnitude (e.g., zero) to a steady-state magnitude $V_{SS}$ (e.g., as shown between times $t_0$ and $t_1$ in FIG. 3). The secondary microprocessor 214 may wait for the wait time period $T_{WAIT}$ after driving the second enable control signal $V_{EN2}$ high (e.g., at time $t_0$) to allow the magnitude of the received signal strength identifier signal $V_{RSSI}$ to stabilize at the steady-state magnitude $V_{SS}$. The secondary microprocessor 214 may then sample the received signal strength identifier signal $V_{RSSI}$ at the end of the wait time period $T_{WAIT}$ (e.g., at time $t_1$ or slightly before time $t_1$). If the magnitude of the received signal strength identifier signal $V_{RSSI}$ (e.g., the steady-state magnitude $V_{SS}$) is greater than or equal to the threshold $V_{TH}$, the secondary microprocessor 214 may drive the wake-up control signal $V_{WAKE\text{-}UP}$ high towards the DC supply voltage $V_{CC}$ for a pulse time period $T_{PULSE}$, before subsequently driving the wake-up control signal $V_{WAKE\text{-}UP}$ low. The primary microprocessor 212 does not go back to the sleep mode in response the wake-up control signal $V_{WAKE\text{-}UP}$ being drive low, but will enter the sleep mode after all necessary processing is complete. The secondary microprocessor 214 may also maintain the third enable control signal $V_{EN3}$ high to keep the power supply 232 enabled after pulsing the wake-up control signal $V_{WAKE\text{-}UP}$.

In response to detecting that the wake-up control signal $V_{WAKE\text{-}UP}$ has been driven high, the primary microprocessor 212 may wake up, drive the switch control signal $V_{SW}$ high to change the RF switch 245 to the first contact 245a (e.g., as shown at time $t_2$ in FIG. 3), and drive the first enable control signal $V_{EN1}$ high to wake-up the primary radio circuit 246 (e.g., as shown at time $t_3$ in FIG. 3). Since the primary radio circuit 246 is awake when the next packet 300 is transmitted (e.g., between times $t_4$ and is in FIG. 3), the primary radio circuit 246 may be configured to receive the packet 300 and the primary microprocessor 212 may be configured to process and respond to the packet. After the primary microprocessor 212 has processed the packet and determined that there are no more packets to transmit or receive and/or all necessary processing in response to the received digital message is complete, the primary microprocessor 212 may drive the first enable control signal $V_{EN1}$ low (e.g., as shown at time $t_6$ in FIG. 3). The primary microprocessor 212 may then drive the switch control signal $V_{SW}$ low to change the RF switch 245 back to the second contact 245b (e.g., as shown at time $t_7$ in FIG. 3) before entering the sleep mode. In response to detecting that the switch control signal $V_{SW}$ was driven low, the secondary microprocessor 214 may subsequently drive the third enable control signal $V_{EN3}$ low to disable the power supply 232 (e.g., as shown at time $t_8$ in FIG. 3). The secondary microprocessor 214 may then begin to periodically drive the second enable control signal $V_{EN2}$ high during the RF sample time period $T_{SMPL-RF}$ once again to determine if any control devices are presently transmitting another one of the packets 300.

The RF sample time period $T_{SMPL-RF}$ and the RF sleep time period $T_{SLP-RF}$ may be sized appropriately to ensure that the RF sample time period $T_{SMPL-RF}$ coincides with at least one packet 300 of a predetermined number of consecutive packets of a data transmission event (e.g., as described in greater detail in previously-referenced U.S. Pat. No. 10,041,292). As a result, the RF sleep time period $T_{SLP-RF}$ may be much longer than the packet time period $T_{PACKET}$. In addition, the RF sample time period $T_{SMPL-RF}$ may be significantly shorter than the packet time period $T_{PACKET}$. For example, as shown in FIG. 3, the first two packets 300 do not coincide with the RF sample time period $T_{SMPL-RF}$ when the secondary radio circuit 248 is awake. At least a portion of the third packet 300 falls with the next RF sample time period $T_{SMPL-RF}$, such that the secondary microprocessor 214 may be able to detect the packet and wake up the primary microprocessor 212. The primary microprocessor 212 may then wake up the primary radio circuit 246, which is able to receive the fourth packet 300. Since the secondary radio circuit 248 periodically wakes up to determine if a packet is being transmitted (e.g., rather than the primary radio circuit 246 waking up) and the secondary radio circuit consumes less power than the primary radio circuit, the control device may have a significant power savings as compared to prior art control devices having RF receivers and/or transceivers.

While FIGS. 2 and 3 show the primary microprocessor 212 generating the switch control signal $V_{SW}$ for controlling the RF switch 245, the secondary microprocessor 214 could also generate the switch control signal $V_{SW}$. For example, after detecting that a packet 300 is presently being transmitted, the secondary microprocessor 214 may drive the wake-up control signal $V_{WAKE-UP}$ high to wake up the primary microprocessor 212 and drive the switch control signal $V_{SW}$ high to change the RF switch 245 to the first contact 245a. The secondary microprocessor 214 may cease periodically enabling the secondary radio circuit 248 and maintain the switch control signal $V_{SW}$ high while the primary radio circuit 246 is awake. The secondary microprocessor 214 may drive the switch control signal $V_{SW}$ low to change the RF switch 245 to the second contact 245b and begin periodically enabling the secondary radio circuit 248 again in response to receiving from the primary microprocessor 212 an indication that the primary radio circuit 246 is in the sleep mode (e.g., in response to the switch control signal $V_{SW}$ being driven low). In addition, the RF switch 245 may be controlled between the first contact 245a and the second contact 245b in response to the wake-up control signal $V_{WAKE-UP}$ and the secondary microprocessor 214 may be configured to maintain the wake-up control signal $V_{WAKE-UP}$ high while the primary radio circuit 246 is awake (e.g., the switch control signal $V_{SW}$ may not be generated by either the primary microprocessor 212 or the secondary microprocessor 214).

Figure 4:
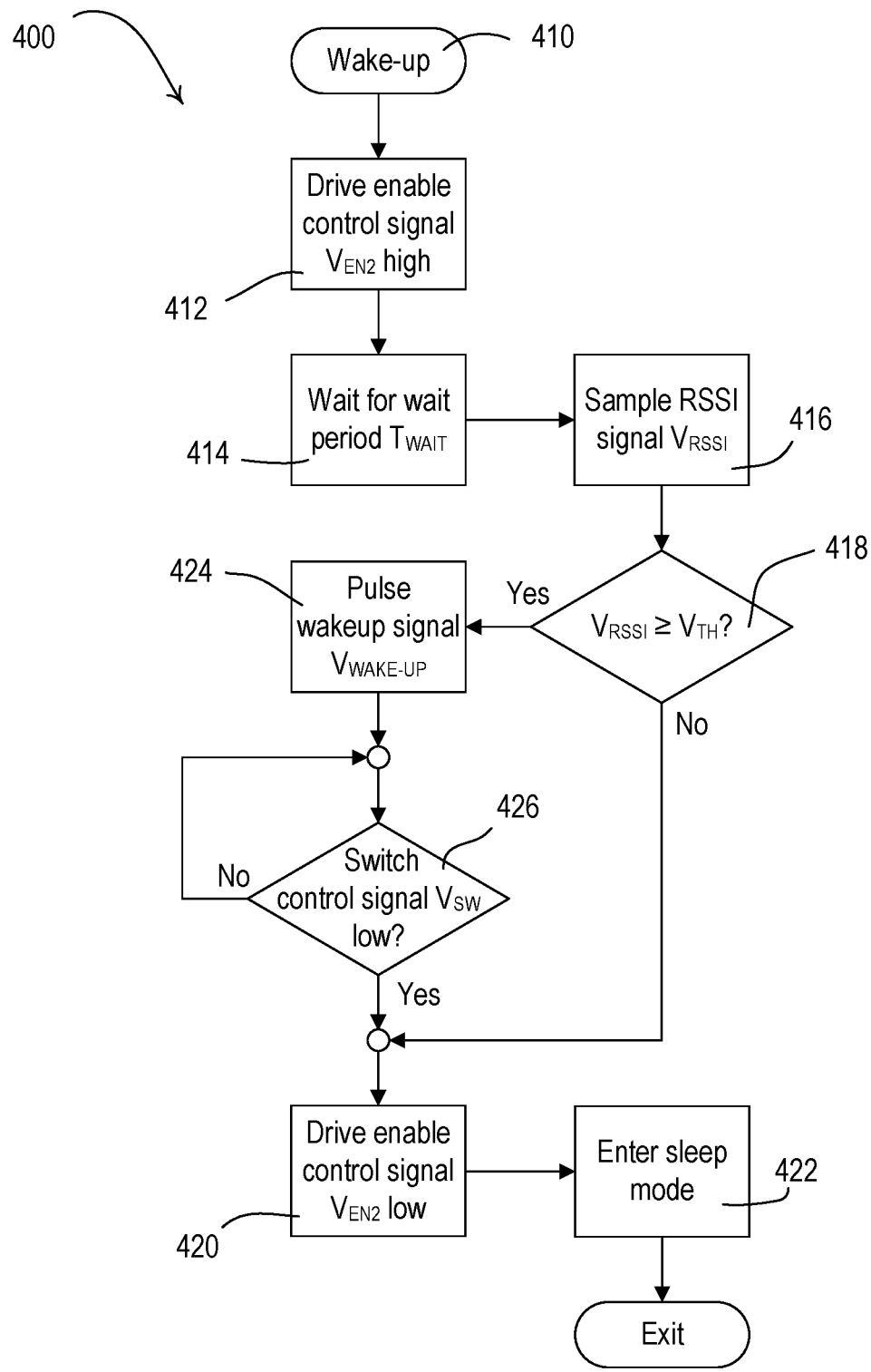
FIG. 4 is a flowchart of an example control procedure that may be executed by a secondary microprocessor of a control device to periodically wake up a secondary radio circuit to determine if a radio-frequency signal is presently being transmitted.

FIG. 4 is a flowchart of an example control procedure 400 that may be executed by a control circuit of a control device (e.g., the secondary microprocessor 214 of the control device 200) to periodically wake up a radio circuit (e.g., the secondary radio circuit 248) to determine if an RF signal (e.g., a packet) is presently being transmitted. The control circuit may generate a wake-up signal $V_{WAKE-UP}$ for causing another control circuit (e.g., the primary microprocessor 212) to wake up another radio circuit (e.g., the primary radio circuit 246). For example, the control procedure 400 may be executed when the control device wakes up from a sleep mode at 410 (e.g., in response to an internal timer of the control device). At 412, the control circuit may first drive the second enable control signal $V_{EN2}$ high to enable the secondary radio circuit 248. At 414, the control circuit may wait for a wait time period $T_{WAIT}$ to allow the magnitude of the received signal strength identifier signal $V_{RSSI}$ generated by the secondary radio circuit 248 to stabilize. The control circuit may sample the received signal strength identifier signal $V_{RSSI}$ at 416 (e.g., at the end of the wait time period $T_{WAIT}$). If the magnitude of the received signal strength identifier signal $V_{RSSI}$ is not greater than or equal to a threshold $V_{TH}$ (e.g., indicating that the magnitude of the received RF signal does exceeds approximately −90 dBm) at 418, the control circuit may drive the second enable control signal $V_{EN2}$ low at 420 and enter the sleep mode at 422, before the control procedure 400 exits.

If the magnitude of the received signal strength identifier signal $V_{RSSI}$ is greater than or equal to the threshold $V_{TH}$ (e.g., indicating that the magnitude of the received RF signal exceeds approximately −90 dBm) at 418, the control circuit may drive the wake-up signal $V_{WAKE-UP}$ high for a pulse time period $T_{PULSE}$ at 424. In response to detecting the pulse in the wake-up signal $V_{WAKE-UP}$, the other control circuit (e.g., the primary microprocessor 212) may wake up the other radio circuit (e.g., the primary radio circuit 246). At 426, the control circuit may wait until the other control circuit indicates that the other radio circuit has been put back to sleep (e.g., by determining when the primary microprocessor 212 has driven the switch control signal $V_{SW}$ low). When the switch control signal $V_{SW}$ has been driven low at 426, the control circuit may then drive the second enable control signal $V_{EN2}$ low at 420 and enter the sleep mode at 422, before the control procedure 400 exits.

Figure 5:
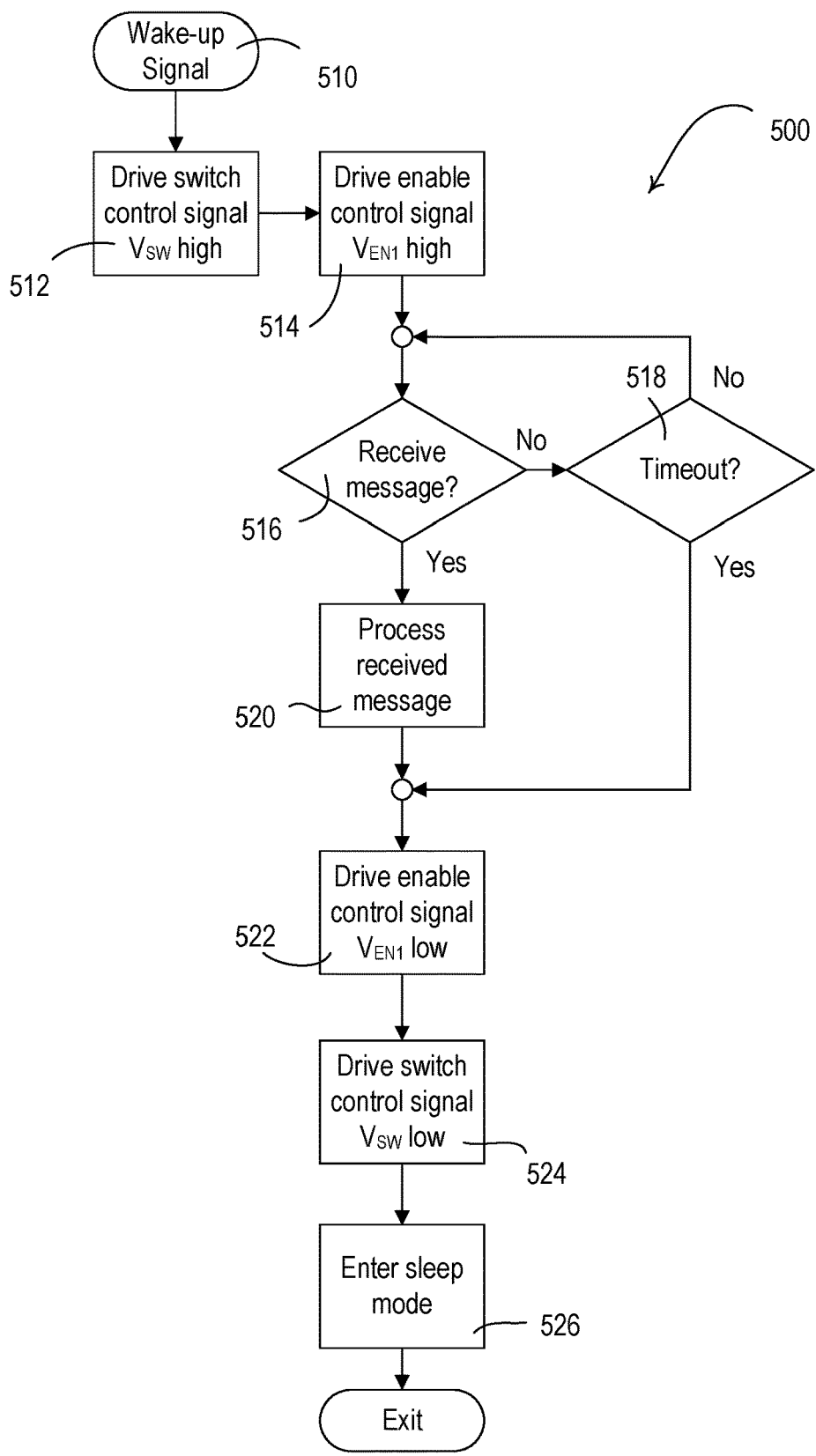
FIG. 5 is a flowchart of an example control procedure that may be executed by a primary microprocessor of a control device to wake up a primary radio circuit and receive a radio-frequency signal.

FIG. 5 is a flowchart of an example control procedure 500 that may be executed by a control circuit of a control device (e.g., the primary microprocessor 212 of the control device 200) to wake up a radio circuit (e.g., the primary radio circuit 246) and receive a digital message (e.g., a packet) via RF signals. The control circuit may execute the control produce 500 in response to receiving a wake-up signal (e.g., the wake-up signal $V_{WAKE-UP}$ from the secondary microprocessor 214) at 510. At 512, the control circuit may first drive the switch control signal $V_{SW}$ high to adjust the RF switch 245 from the second contact 245b to the first contact 245a (e.g., to connect the primary radio circuit 246 to the antenna 242). At 514, the control circuit may drive the first enable control signal $V_{EN1}$ high to enable the radio circuit. If the control circuit receives a message via the primary radio circuit 246 at 516 before a timeout expires at 518, the control circuit may process the received message at 520. For example, the control circuit may control a load control circuit (e.g., the load control circuit 220) to control an electrical load, illuminate visual indicators (e.g., visual indicators of the user interface 222) to provide feedback, and/or transmit a message via the primary radio circuit 246 in response to the received message at 520. The control circuit may then drive the first enable control signal $V_{EN1}$ low to cause the primary radio circuit 246 to enter the sleep mode at 522. If the timeout expires at 518 before the control circuit receive a message at 516, the control circuit may simply put the primary radio circuit 246 in the sleep mode at 522. At 524, the control circuit may drive the switch control signal $V_{SW}$ low at 524 to adjust the RF switch 245 from the first contact 245*a* to the second contact 245*b*. At 526, the control circuit may enter the sleep mode, before the control procedure 500 exits.

While the control device 200 has been described herein with the control circuit 210 comprising the primary microprocessor 212 and the secondary microprocessor 214, the functions of the control circuit 210 could be implemented by a single microprocessor and/or additional microprocessors. In addition, the either or both of the primary microprocessor 212 and the secondary microprocessor 214 may be implemented on a single integrated circuit including either or both of the primary radio circuit 246 and the secondary radio circuit 248. For example, the primary microprocessor 212 and the primary radio circuit 246 may be implemented on a single integrated circuit, and/or the secondary microprocessor 214 and the secondary radio circuit 248 may be implemented on a single integrated circuit. Further, the primary radio circuit 246 and the secondary radio circuit 248 may be implemented in a single integrated circuit.

Although features and elements may be described herein in particular combinations, each feature or element may be used alone or in any combination with the other features and elements. While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A control device comprising:
   a primary radio circuit configured to receive radio-frequency signals via an antenna;
   a control circuit coupled to the primary radio circuit, the control circuit configured to control the primary radio circuit into a sleep mode; and
   a secondary radio circuit configured to generate a first control signal indicating that a radio-frequency signal is presently being transmitted by an external device;
   wherein the control circuit is configured to wake up the primary radio circuit from the sleep mode in response to the secondary radio circuit generating the first control signal indicating that the radio-frequency signal is presently being transmitted by the external device.

2. The control device of claim 1, wherein the control circuit comprises a primary microprocessor configured to process the radio-frequency signals received via the primary radio circuit and control the primary radio circuit into and out of the sleep mode.

3. The control device of claim 2, wherein the control circuit comprises a secondary microprocessor configured to receive the first control signal from the secondary radio circuit, and generate a second control signal in response to determining that the radio-frequency signal is presently being transmitted by the external device.

4. The control device of claim 3, wherein the secondary microprocessor is configured to periodically wake up the secondary radio circuit to determine if a radio-frequency signal is being transmitted by the external device.

5. The control device of claim 4, wherein the control signal generated by the secondary radio circuit has a magnitude that indicates a signal strength of a received RF signal, the secondary microprocessor configured to wait for a wait time period after waking up the secondary radio circuit before sampling the control signal generated by the secondary radio circuit.

6. The control device of claim 5, wherein, when a magnitude of the control signal generated by the secondary radio circuit exceeds a threshold, the secondary microprocessor is configured to generate the second control signal to indicate that the radio-frequency signal is presently being transmitted by the external device.

7. The control device of claim 3, wherein the primary microprocessor is configured to enter a sleep mode, and wake up from the sleep mode in response to receiving the second control signal from the secondary microprocessor.

8. The control device of claim 7, wherein the primary microprocessor is configured to wake up the primary radio circuit from the sleep mode in response to receiving the second control signal from the secondary microprocessor.

9. The control device of claim 3, wherein the secondary microprocessor and the secondary radio circuit are implemented on a single integrated circuit.

10. The control device of claim 3, wherein the primary radio circuit and the secondary radio circuit are implemented on a single integrated circuit.

11. The control device of claim 1, further comprising:
    a load control circuit for controlling an electrical load;
    wherein the control circuit is configured to receive a message via the primary radio circuit after waking up the primary radio circuit and control the load control circuit to control the electrical load in response to the message.

12. The control device of claim 11, wherein the electrical load comprises a lighting load, and the load control circuit comprises a controllably conductive device coupled in series with the lighting load for controlling an amount of power delivered to the lighting load.

13. The control device of claim 11, wherein the electrical load comprises a motor, and the load control circuit comprises a motor drive circuit for controlling the motor to adjust a position of a covering material of a motorized window treatment.

14. The control device of claim 1, further comprising:
    a radio-frequency switch configured to selectively couple the antenna to the primary radio circuit and the secondary radio circuit.

15. The control device of claim 11, wherein the primary microprocessor is configured to control the radio-frequency switch to connect the primary radio circuit to the antenna in response to the secondary radio circuit generating the first control signal indicating that the radio-frequency signal is presently being transmitted by the external device.

16. The control device of claim 1, wherein the secondary radio circuit consumes less power than the primary radio circuit.

17. The control device of claim 16, further comprising:
a battery for powering the primary and secondary radio circuits and the control circuit.

18. The control device of claim 1, further comprising:
a user interface comprising one or more actuators for receiving user inputs;
wherein the control circuit is configured to transmit a first digital message for controlling an electrical load via the primary radio circuit in response an actuation of one of the actuators of the user interface.

19. The control device of claim 18, wherein the control circuit is configured to illuminate at least one visual indicator of the user interface in response to a second digital message received via the primary radio circuit.

20. The control device of claim 1, further comprising:
a sensing circuit configured to detect one or more environmental characteristics in an environment of the control device;
wherein the control circuit is configured to transmit a digital message for controlling an electrical load via the primary radio circuit in response the sensing circuit.

21. The control device of claim 1, wherein the secondary radio circuit is configured to wake up periodically to determine if a radio-frequency signal is being transmitted by the external device.

22. The control device of claim 1, wherein the control signal generated by the secondary radio circuit has a magnitude that indicates a signal strength of a received RF signal.

23. The control device of claim 1, wherein the primary microprocessor and the primary radio circuit are implemented on a single integrated circuit.

\* \* \* \* \*